(12) United States Patent
Choi et al.

(10) Patent No.: US 12,603,381 B2
(45) Date of Patent: Apr. 14, 2026

(54) BATTERY MODULE AND BATTERY PACK INCLUDING THE SAME

(71) Applicant: LG ENERGY SOLUTION, LTD., Seoul (KR)

(72) Inventors: Jonghwa Choi, Daejeon (KR); Junyeob Seong, Daejeon (KR); Junkyu Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 996 days.

(21) Appl. No.: 17/779,282

(22) PCT Filed: Mar. 9, 2021

(86) PCT No.: PCT/KR2021/002881
§ 371 (c)(1),
(2) Date: May 24, 2022

(87) PCT Pub. No.: WO2021/201454
PCT Pub. Date: Oct. 7, 2021

(65) Prior Publication Data
US 2022/0407172 A1 Dec. 22, 2022

(30) Foreign Application Priority Data

Apr. 1, 2020 (KR) ........................ 10-2020-0039762

(51) Int. Cl.
*H01M 50/211* (2021.01)
*H01M 50/244* (2021.01)
(Continued)

(52) U.S. Cl.
CPC ..... *H01M 50/3425* (2021.01); *H01M 50/211* (2021.01); *H01M 50/244* (2021.01); *H01M 50/249* (2021.01); *H01M 2220/20* (2013.01)

(58) Field of Classification Search
CPC .. H01M 50/30; H01M 50/342; H01M 50/211; H01M 50/209
See application file for complete search history.

(56) References Cited

U.S. PATENT DOCUMENTS

2013/0252037 A1* 9/2013 Chiba ..................... F16K 17/16
429/53
2018/0028336 A1 2/2018 Kim et al.
(Continued)

FOREIGN PATENT DOCUMENTS

CN 107851752 A 3/2018
CN 108630851 A 10/2018
(Continued)

OTHER PUBLICATIONS

International Search Report (PCT/ISA/210) issued in PCT/KR2021/002881, dated Jul. 5, 2021.

*Primary Examiner* — Nicholas A Smith
*Assistant Examiner* — Zackary Richard Cochenour
(74) *Attorney, Agent, or Firm* — Birch, Stewart, Kolasch & Birch, LLP

(57) ABSTRACT

A battery module includes: a battery cell stack in which a plurality of battery cells are stacked; and a module frame for housing the battery cell stack, wherein a vent is formed on the lower surface of the module frame, wherein the battery cell comprises: a cell main body; electrode leads formed to protrude from both ends of the cell main body; and a terrace part formed to extend from the cell case in a direction in which the electrode leads protrude, and wherein the vent is formed adjacent to a portion where the terrace part is located rather than the cell main body.

16 Claims, 12 Drawing Sheets

(51) Int. Cl.
　　H01M 50/249 　　(2021.01)
　　H01M 50/342 　　(2021.01)

(56) References Cited

U.S. PATENT DOCUMENTS

| | | | |
|---|---|---|---|
| 2018/0114961 A1 | 4/2018 | Kim et al. | |
| 2018/0212214 A1 | 7/2018 | Sakai et al. | |
| 2018/0269443 A1 | 9/2018 | Takahashi et al. | |
| 2018/0358593 A1 | 12/2018 | Seo et al. | |
| 2019/0088914 A1* | 3/2019 | Choi | H01M 50/211 |
| 2019/0131596 A1 | 5/2019 | Yang et al. | |
| 2019/0372083 A1 | 12/2019 | Ryu et al. | |
| 2020/0212388 A1* | 7/2020 | Chen | H01M 50/264 |
| 2021/0194101 A1 | 6/2021 | Kim et al. | |
| 2021/0226295 A1 | 7/2021 | Kwon et al. | |

FOREIGN PATENT DOCUMENTS

| | | | |
|---|---|---|---|
| CN | 109473572 A | 3/2019 | |
| CN | 110085787 A | 8/2019 | |
| EP | 2 738 834 A1 | 6/2014 | |
| JP | 2006-244755 A | 9/2006 | |
| JP | 2012-104499 A | 5/2012 | |
| JP | 2016-134335 A | 7/2016 | |
| JP | 2018-158825 A | 10/2018 | |
| JP | 6645500 B2 | 2/2020 | |
| KR | 10-2010-0081942 A | 7/2010 | |
| KR | 10-2014-0077811 A | 6/2014 | |
| KR | 10-2015-0066964 A | 6/2015 | |
| KR | 10-2018-0006160 A | 1/2018 | |
| KR | 10-2018-0044083 A | 5/2018 | |
| KR | 10-2018-0112615 A | 10/2018 | |
| KR | 10-2019-0037387 A | 4/2019 | |
| KR | 10-2019-0124022 A | 11/2019 | |
| KR | 10-2020-0008624 A | 1/2020 | |
| WO | 2013/018283 A1 | 2/2013 | |
| WO | 2014/065110 A1 | 5/2014 | |
| WO | WO 2017/013883 A1 | 1/2017 | |
| WO | WO 2019/203460 A1 | 10/2019 | |

* cited by examiner 20                    20

A          A

Conventional Art

Conventional Art

BATTERY MODULE AND BATTERY PACK INCLUDING THE SAME

TECHNICAL FIELD

Cross Citation with Related Application(s)

This application claims the benefit of Korean Patent Application No. 10-2020-0039762 filed on Apr. 1, 2020 with the Korean Intellectual Property Office, the disclosure of which is incorporated herein by reference in its entirety.

The present disclosure relates to a battery module and a battery pack including the same, and more particularly, to a battery module having enhanced stability, and a battery pack including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series or in parallel.

Meanwhile, when a plurality of battery cells are connected in series or in parallel to configure a battery pack, a method of configuring a battery module composed of a plurality of battery cells and then adding other components to at least one battery module to configure a battery pack is common. Since the battery cells constituting these middle or large-sized battery modules are composed of chargeable/dischargeable secondary batteries, such a high-output and large-capacity secondary battery generates a large amount of heat in a charging and discharging process.

The battery module may include a battery cell stack in which a plurality of battery cells are stacked, a frame for housing the battery cell stack, and end plates for covering the front and rear surfaces of the battery cell stack.

FIG. 1 is a view showing the appearance of a battery module mounted on a conventional battery pack at the time of ignition. FIG. 2 is a section taken along line A-A of FIG. 1 and is a cross-sectional view showing the appearance of a flame that affects adjacent battery modules during ignition of a battery module mounted on a conventional battery pack.

Referring to FIGS. 1 and 2, the conventional battery module includes a battery cell stack in which a plurality of battery cells 10 are stacked, a frame 20 for housing the battery cell stack, end plates 30 formed on the front and rear surfaces of the battery cell stack, terminal bus bars 40 formed so as to protrude to the outside of the end plates 30, and the like.

The frame 20 and the end plate 30 can be joined so as to be sealed by welding. When the internal pressure of the battery cells 10 increases during overcharge of the battery module to exceed a limit value of the fusion strength of the battery cell, high-temperature heat, gas, and flame generated in the battery cells 10 can be discharged to the outside of the battery cell 10.

At this time, the high-temperature heat, gas and flame may be discharged through the openings formed in the end plates 30. However, in a battery pack structure in which a plurality of battery modules are arranged so that the end plates 30 face each other, the high-temperature heat, gas and flame ejected from the battery module may affect a battery module. Thereby, the terminal bus bar 40 formed on the adjacent end plates 30 of the battery module may be damaged, and high-temperature heat, gas, and flame may enter the inside of the battery module via the openings formed in the adjacent end plates 30 of the battery module to damage the plurality of battery cells 10.

DETAILED DESCRIPTION OF THE INVENTION

Technical Problem

It is an object of the present disclosure to provide a battery module capable of dispersing high-temperature heat and flame discharged when an ignition phenomenon occurs in the battery module, and a battery pack including the same.

The objects of the present disclosure are not limited to the aforementioned objects, and other objects which are not described herein should be clearly understood by those skilled in the art from the following detailed description.

Technical Solution

According to embodiments of the present disclosure, there is provided a battery module comprising: a battery cell stack in which a plurality of battery cells are stacked; and a module frame for housing the battery cell stack, wherein a vent is formed on the lower surface of the module frame, wherein each battery cell of the plurality of battery cells comprises: a cell main body; electrode leads formed to protrude from opposite ends of the cell main body; and a terrace part formed to extend from the cell case in a direction in which the electrode leads protrude, wherein the vent is formed adjacent to a portion where the terrace part is located.

The vent may be formed at a position corresponding to a portion where the terrace part is located.

The battery module may further include a first end plate and a second end plate located on a front surface and a rear surface of the battery cell stack, respectively.

The vent may have a hole structure formed on the lower surface of the module frame.

The hole structure may penetrate the lower surface of the module frame at an oblique angle.

The hole structure may have an inclined direction having an outlet closer to an end plate that is located farther from the vent among the first end plate and the second end plate.

The vent may include an inlet port formed on the lower surface of the module frame and facing the battery cell stack, an outlet port for discharging gas that has flowed in through the inlet port, and a connection part for connecting the inlet port and the outlet port.

The outlet port may be perpendicular to the inlet port.

The connection part may protrude from the lower surface of the module frame.

The vent may discharge gas in a direction of the end plate located farther from the vent.

The battery module may further include a pack frame, the module frame being within the pack case further comprising a pack frame, the module frame being within the pack case further comprising a pack frame, the module frame being within the pack case, the first end plate and the second end plate may include a module mounting part for fixing the battery module, a support member may be inserted into the module mounting part, and the lower surface of the module frame may be spaced above a bottom part of a pack frame by the support member.

The support member may protrude downwardly from the lower surface of the module frame.

According to embodiments of the present disclosure, there is provided a battery pack comprising two or more of the battery modules, wherein among the two or more battery modules, a first battery module and a second battery module may have openings formed on surfaces facing each other.

The vent of the first battery module may be formed so as to discharge gas in a direction opposite to a direction in which the second battery module is located.

The battery pack may further include a pack frame for housing the two or more battery modules, wherein the two or more battery modules may be spaced above a bottom part of the pack frame.

Advantageous Effects

A battery module and a battery pack including the same according to embodiments of the present disclosure can disperse high-temperature heat, gas, and flame generated at the time of ignition of the battery module through a vent formed on the upper surface of the module frame, thereby minimizing a damage applied to the battery module and facing battery module terminals and the portions of plural battery cells.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 12 is a top plan view of a battery pack according to embodiments of the present disclosure.

DETAILED DESCRIPTION OF THE EMBODIMENTS

Figure 1:
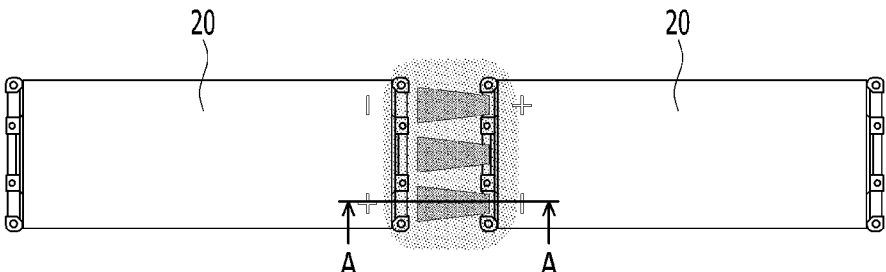
FIG. 1 is a view showing the appearance of a battery module mounted on a conventional battery pack at the time of ignition.
Figure 2:
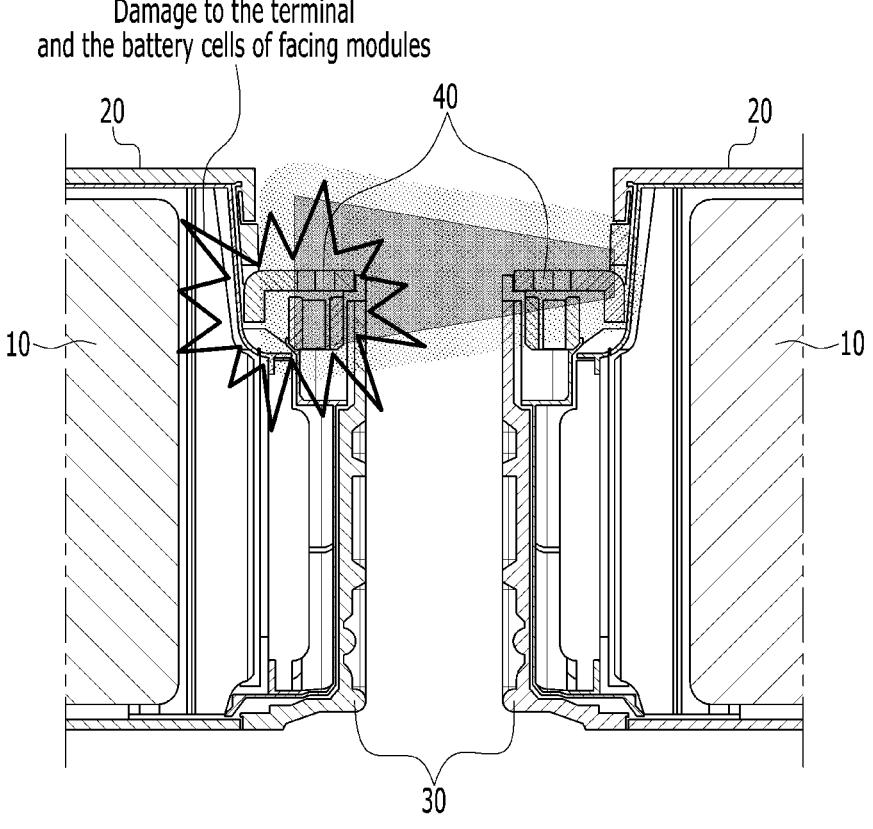
FIG. 2 shows a section taken along line A-A in FIG. 1 and is a cross-sectional view showing the appearance of a flame that affects adjacent battery modules during ignition of a battery module mounted on a conventional battery pack.

Hereinafter, various embodiments of the present disclosure will be described in detail with reference to the accompanying drawings so that those skilled in the art can easily implement them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Hereinafter, a battery module according to embodiments of the present disclosure will be described with reference to FIGS. 3 to 7.

Figure 3:
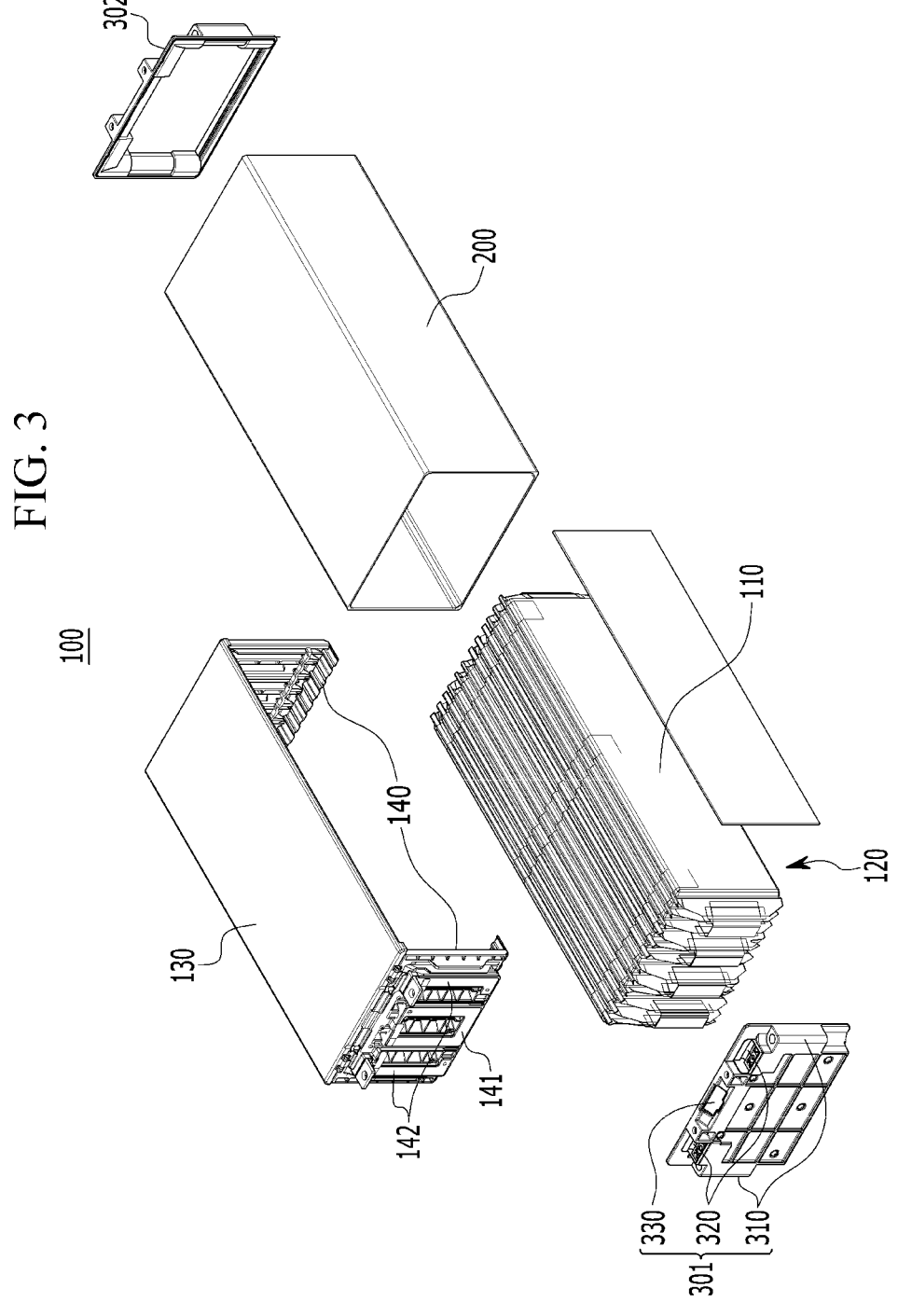
FIG. 3 is an exploded perspective view of a battery module according to embodiments of the present disclosure.
Figure 4:
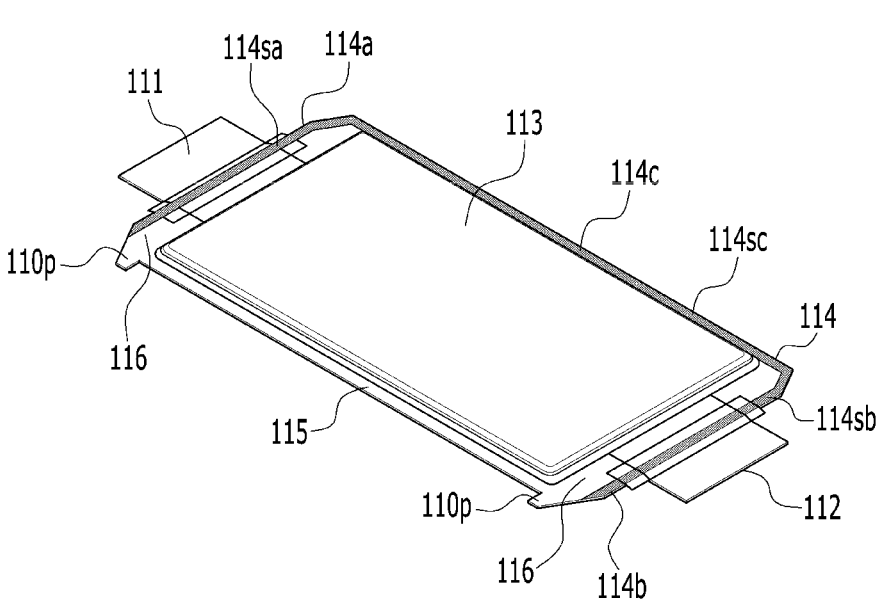
FIG. 4 is a perspective view of a battery cell contained in the battery module of FIG. 3.
Figure 5:
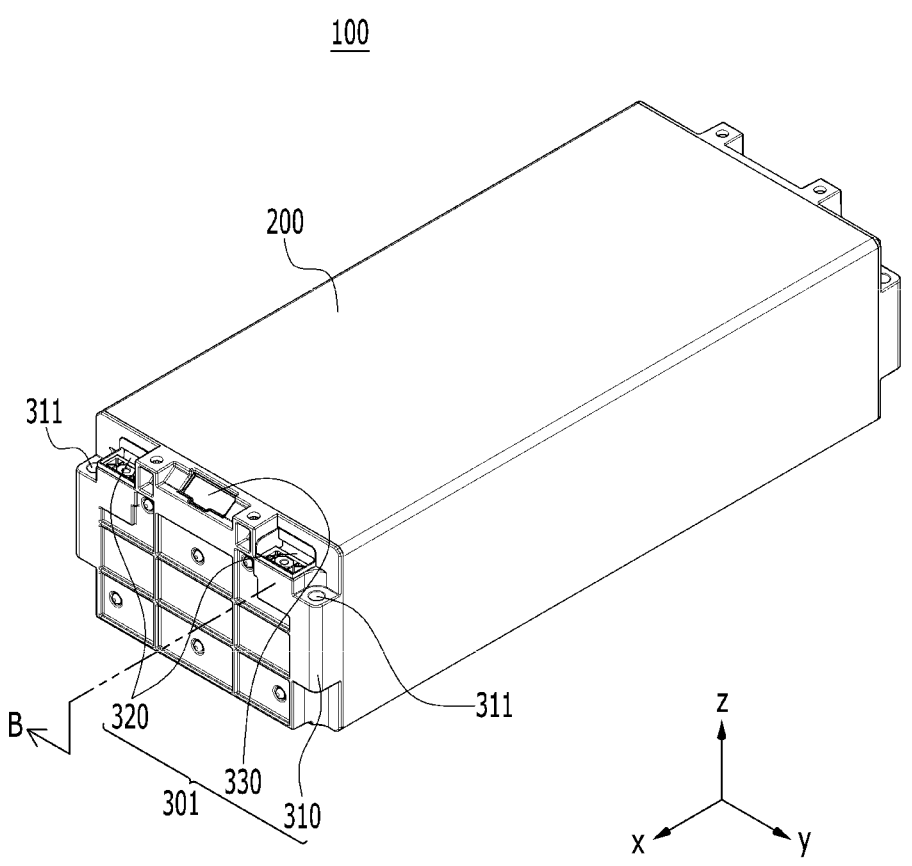
FIG. 5 is a perspective view showing a state in which the battery module of FIG. 3 has been joined.
Figure 6:
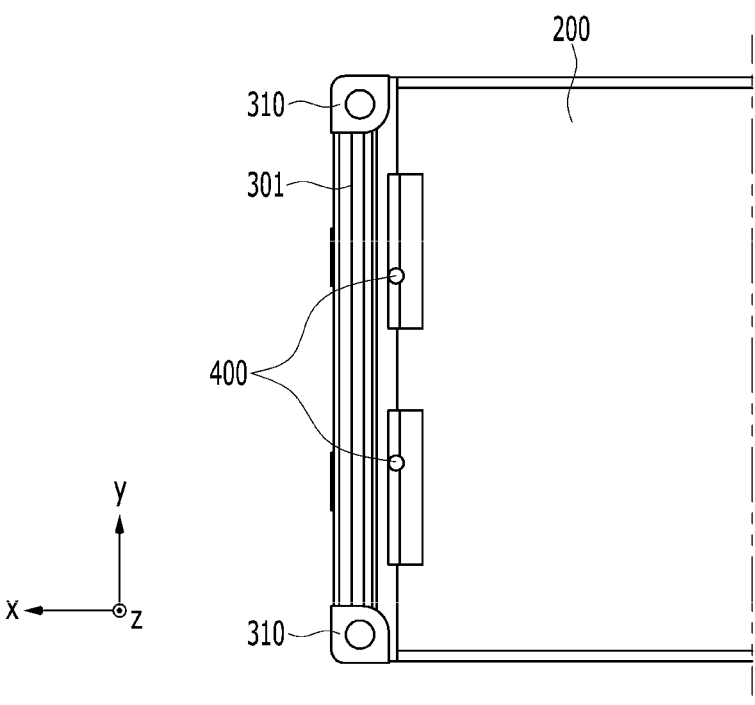
FIG. 6 is a plan view showing a lower surface of the battery module of FIG. 5.

FIG. 3 is an exploded perspective view of a battery module according to embodiments of the present disclosure. FIG. 4 is a perspective view of a battery cell contained in the battery module of FIG. 3. FIG. 5 is a perspective view showing a state in which the battery module of FIG. 3 has been joined.

The battery module according to embodiments of the present disclosure includes a battery cell stack 120 in which a plurality of battery cells 110 are stacked; and a module frame 200 for housing the battery cell stack 120, wherein a vent 400 is formed on the lower surface of the module frame 200. As used herein, the vent means a part for discharging heat or gas inside the battery module 100.

Referring to FIG. 4, the battery cell 110 is preferably a pouch-type battery cell. For example, the battery cell 110 according to embodiments of the present disclosure has a structure in which two electrode leads 111 and 112 face each other and protrude from one end 114*a* and the other end 114*b* of the cell main body 113, respectively. More specifically, the electrode leads 111 and 112 are connected to an electrode assembly (not shown), and protrude from the electrode assembly (not shown) to the outside of the battery cell 110. Meanwhile, the battery cell 110 can be manufactured by joining both ends 114*a* and 114*b* of the cell case 114 and one side part 114*c* connecting them in a state in which the electrode assembly (not shown) is housed in a cell case 114.

In other words, the battery cell 110 according to embodiments of the present disclosure has a total of three sealing parts 114sa, 114sb and 114sc, the sealing part 114sa, 114sb and 114sc have a structure sealed by a method such as heat fusion, and the remaining other side part may be formed of a connection part 115. The cell case 114 may be formed of a laminated sheet containing a resin layer and a metal layer.

In addition, the connection part 115 may extend long along one edge of the battery cell 110, and a protrusion part 110p of the battery cell 110 called a bat-ear may be formed at an end of the connection part 115. Further, while the cell case 114 is sealed with the protruding electrode leads 111 and 112 being interposed therebetween, a terrace part 116 may be formed between the electrode leads 111 and 112 and the cell main body 113. That is, the battery cell 110 includes a terrace part 116 formed to extend from the cell case 114 in a direction in which the electrode leads 111 and 112 protrude.

The battery cell 110 may be composed of a plurality of cells, and the plurality of battery cells 110 may be stacked so as to be electrically connected to each other, thereby forming a battery cell stack 120. An upper plate 130 may be located on the upper side of the battery cell stack 120, and a bus bar frame 140 may be located on a front surface and a rear surface of the battery cell stack 120 in the direction in which the electrode leads 111 and 112 protrude, respectively. The battery cell stack 120, the upper plate 130, and the bus bar frame 140 may be housed together in the module frame 200.

A thermal conductive resin may be injected between the battery cell stack 120 and the lower surface of the module frame 200, and a thermal conductive resin layer (not shown) may be formed between the battery cell stack 120 and the lower surface of the module frame 200 through the injected thermal conductive resin. Through the module frame 200, the battery cell stack 120 housed inside the module frame 200 and the electrical components connected thereto can be protected from external physical impact.

A bus bar frame 140 can be located on the front surface and the rear surface of the battery cell stack 120, respectively, to cover the battery cell stack 120 and at the same time, guide the connection between the battery cell stack 120 and an external device. Specifically, a bus bar 141 and a terminal bus bar 142 may be mounted on the bus bar frame 140. The electrode leads 111 and 112 of the battery cells 110 may pass through a slit formed in the bus bar frame 140 and then be curved to be joined to the bus bar 141 or the terminal bus bar 142. The battery cells 110 constituting the battery cell stack 120 may be connected in series or in parallel via the bus bar 141, and the battery cells 110 may be electrically connected to an external device or circuit through the terminal bus bar 142 exposed to the outside of the battery module 100. Further, a connector (not shown) may be mounted on the bus bar frame 140, and the temperature or voltage data of the battery cell 110 measured through a sensing assembly (not shown) may be transferred to an external BMS (Battery Management System) or the like through a connector (not shown).

The end plates 301 and 302 are formed so as to cover the front surface and the rear surface of the battery cell stack 120. Specifically, the first end plate 301 and the second end plate 302 may be located on the front surface and the rear surface of the battery cell stack 120, respectively. The end plates 301 and 302 can protect the bus bar frame 140 and various electrical components connected thereto from external impacts, and for this purpose, it needs to have a predetermined strength and can contain a metal such as aluminum.

The end plates 301 and 302 are formed a terminal bus bar opening 320 and a connector opening 330 for connecting a terminal bus bar 142 mounted on the bus bar frame 140 and the connector (not shown) to the outside, and gas or heat generated from the battery cell 110 can be discharged to the outside of the battery module 100 through the openings 320 and 330. The end plates 301 and 302 and the module frame 200 are joined by welding, and the plurality of battery cells 110 located inside the module frame 200 and the end plates 301 and 302 can be interrupted from being connected to the outside except for the above-mentioned openings 320 and 330, through the joining structure of the end plates 301 and 302 and the module frame 200 sealed by welding.

The conventional battery module can discharge high-temperature heat, gas, or flame generated in the battery cell through the openings as described above. However, in the battery pack structure in which a plurality of battery modules are arranged so that the end plates face each other, the high-temperature heat, gas, and flame ejected from the battery module may damage adjacent battery modules.

Thus, a vent 400 can be formed on the lower surface of the module frame 200 according to embodiments of the present disclosure, thereby dispensing heat, gas, flame, etc. discharged through the openings 320 and 330. The vent 400 may have a hole structure formed on the lower surface of the module frame 200. The discharge path inside the battery module can be diversified through the vent 400, thereby preventing a phenomenon in which the discharge is concentrated only to a part of the battery module 100 at the time of ignition, and dispersing the discharge of high-temperature heat, gases and flame.

Further, the vent 400 is formed adjacent to the portion where the terrace part 116 is located rather than to the cell main body 113. A lot of heat is generated in the electrode leads 111 and 112 of the battery cells 110 and the terrace part 116 adjacent thereto, and as the sealing of the terrace part 116 is released due to the pressure change inside the battery cell 110, high-temperature heat, gas, and flame can be discharged. At this time, the vent 400 according to embodiments of the present disclosure is formed adjacent to the part where the terrace part 116 is located rather than to the cell main body 113, so that high-temperature heat, gas, and flame may be immediately discharged to the outside of the battery module 100. In one example, the vent 400 may be formed at a position corresponding to the terrace part 116.

Meanwhile, since the vent 400 according to embodiments of the present disclosure is formed on the lower surface of the module frame 200, it is possible to prevent a phenomenon in which foreign matter floating in the air enters the inside of the battery module 100 via the vent 400.

Hereinafter, the vents 500 and 600 according to modified embodiments of the present disclosure will be described with reference to FIGS. 8 and 9.

Figure 8:
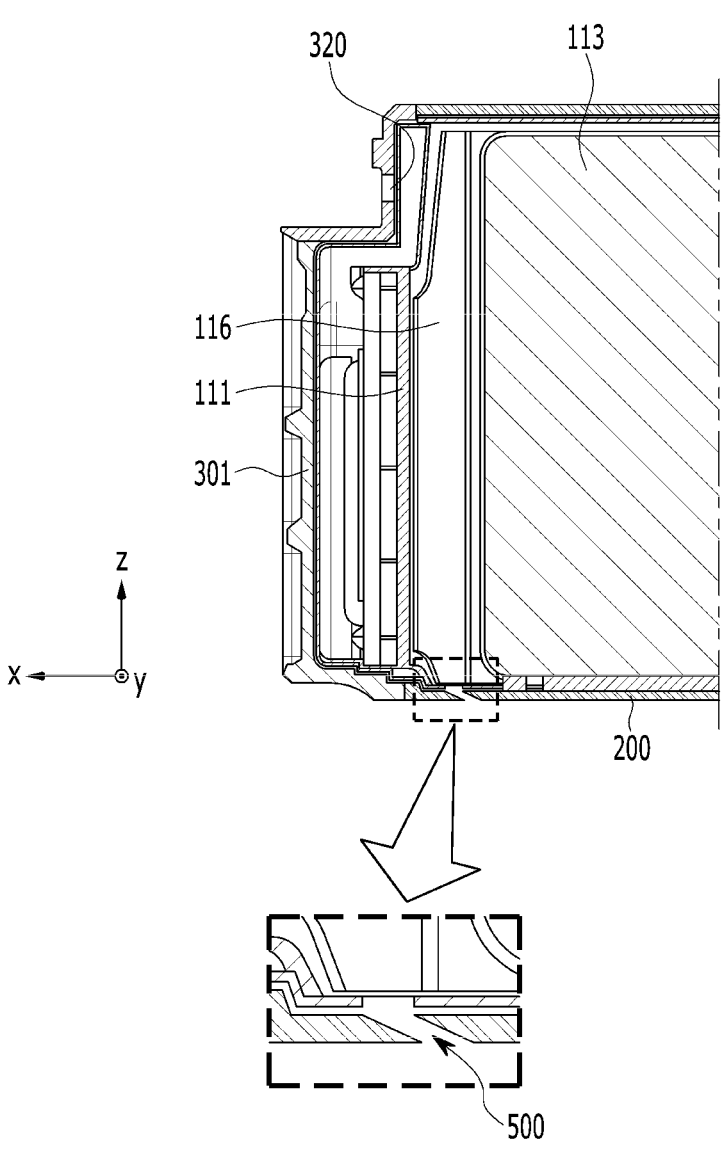
FIGS. 8 and 9 are cross-sectional views of battery modules according to modified embodiments of the present disclosure, respectively.
Figure 9:
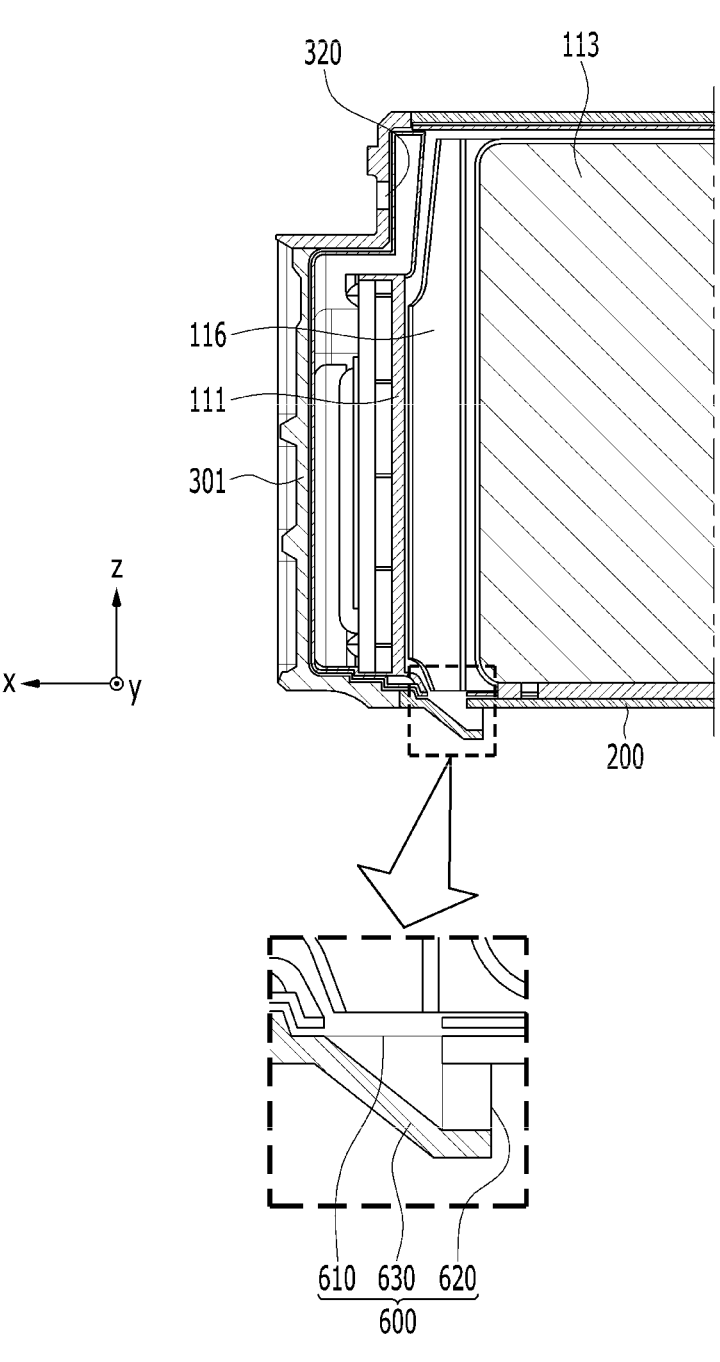

FIGS. 8 and 9 are cross-sectional views of battery modules according to modified embodiments of the present disclosure, respectively.

Referring to FIGS. 8 and 9 together with FIG. 3, the vents 500 and 600 according to embodiments of the present disclosures may be formed so as to discharge gas in a direction of an end plate located farther among the first end plate 301 and the second end plate 302. As shown in FIGS. 8 and 9, the vents 500 and 600 located close to the first end plate 301 may be formed so as to discharge gas in the direction of the second end plate 302 located further away.

The vents 500 and 600 are formed at positions corresponding to the portion where the terrace part 116 is located, but the first end plate 301 is closer than the second end plate

302 located on the opposite side of the reference of the battery cell stack 120. Therefore, when gas is discharged in the direction of the first end plate 301, high-temperature heat, gas, and flame can be emitted to other battery modules adjacent to the first end plate 301, thereby causing damage. In order to prevent this, the vents 500 and 600 are preferably formed so as to discharge gas in the direction of the second end plate 302. This will be described again with reference to FIG. 12 below.

Referring to FIG. 8, the vent 500 may have a hole structure formed on the lower surface of the module frame 200, and further may have a hole structure that obliquely penetrates the lower surface of the module frame 200.

Specifically, the inner inlet port of the obliquely pen- etrated vent 500 is formed closer to the first end plate 301 than to the outer outlet port, and the outer outlet port may be formed closer to the second end plate 302 than to the inner inlet port. In other words, the vent 500 may have an inclined direction getting closer to an end plate located further from the vent 500 among the first end plate 301 and the second end plate 302.

By providing the structure as described above, it is possible to naturally impart directionality to heat or gas discharged through the vent 500. That is, it can be induced so as to discharge gas in the direction of the second end plate 302 located further away, thereby preventing damage to other battery modules adjacent to the first end plate 301.

Further, the vent 500 according to embodiments of the present disclosure has the advantages in that it has a through- hole structure, does not require a separate additional space, and can impart the directionality of the discharged gas by penetrating the module frame 200.

Next, referring to FIG. 9, the vent 600 may include an inlet port 610 formed on the lower surface of the module frame 200 and facing one surface of the battery cell along the stacking direction of the battery cell stack, an outlet port 620 for discharging gas that has flowed in through the inlet port 610, and a connection part 630 for connecting the inlet port 610 and the outlet port 620.

The outlet port 620 may be formed in a direction perpen- dicular to the inlet port 610. Further, the connection part 630 may have a shape protruding from the lower surface of the module frame 200, and may be formed to be inclined. Therefore, the outlet port 620 may also be formed on the outside of the lower surface of the module frame 200.

Based on the structure as described above, the vent 600 according to embodiments of the present disclosure may more reliably guide heat or gas inside the battery module toward the second end plate 302. That is, it has the advantage of more reliably imparting the directionality of heat or gas. Further, the connection part 630 may perform the role as a kind of cover and thus, prevent foreign matter from entering the inside of the battery module.

Figure 10:
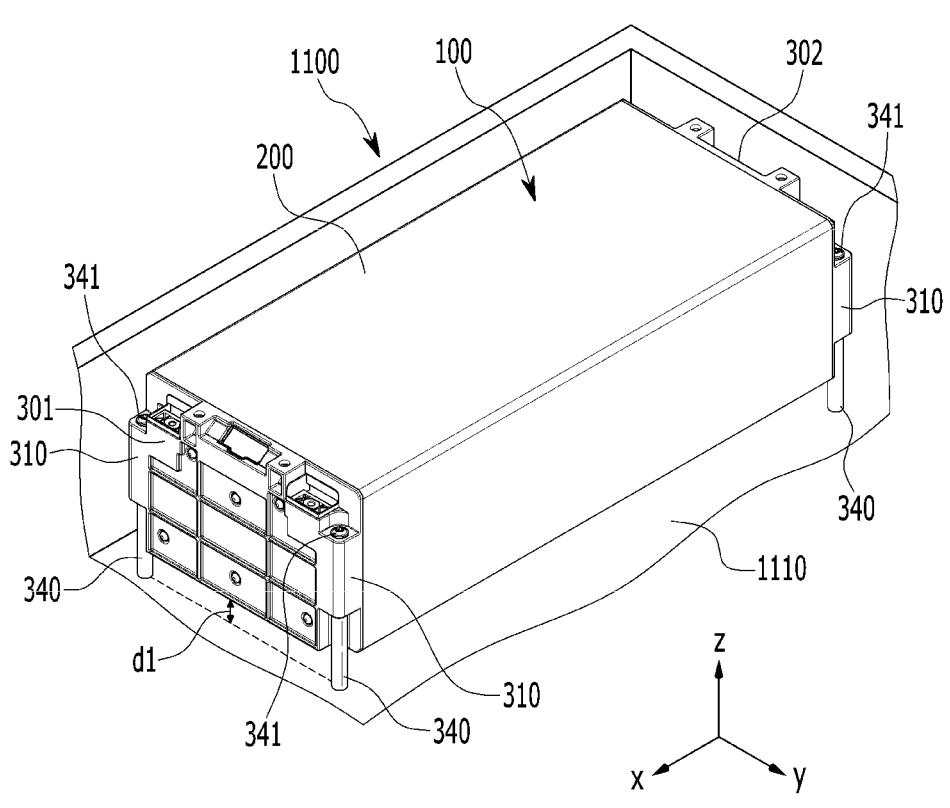
FIG. 10 is a perspective view showing a state in which a battery module according to embodiments of the present disclosure is mounted on a pack frame.

FIG. 10 is a perspective view showing a state in which a battery module according to embodiments of the present disclosure is mounted on a pack frame 1100.

Referring to FIG. 10 together with FIG. 5, a module mounting part 310 may be formed on the end plates 301 and 302 so that the battery module 100 can be mounted and fixed to a pack frame 1100 of the battery pack. The number of the module mounting parts 310 is not limited, but it is preferable that for stable mounting of the battery module 100, two are formed on both sides of the first end plate 301, and two on both sides of the second end plate 302, and thus, a total of four is formed.

The support member 340 may be inserted into the module mounting part 310. Specifically, a mounting hole 311 may be formed in the module mounting part 310, and the support member 340 may be inserted into the mounting hole 311. A through hole may be formed in the bottom part 1110 of the pack frame 1100, and one end of the support member 340 that has passed through the mounting hole 311 may be joined to the through hole of the bottom part 1110. In one example, one end of the support member 340 may be provided in a bolt shape and joined with a nut-shaped through hole of the bottom part 1110. However, the joining is not limited to the bolt and nut joining, and may be implemented through various embodiments.

Meanwhile, the support member 340 can be cylindrical so that it can be inserted into the mounting hole 311 of the module mounting part 310. Further, a head part 341 may be formed at the other end opposite to the one end of the support member 340. The head part 341 is formed to have a wider radius than the mounting hole 311, so that it is not inserted into the mounting hole 311, and the end plates 301 and 302 can be closely adhered and fixed to the bottom part 1110. Through this, the battery module 100 may be mounted and fixed to the pack frame 1100.

At this time, it is preferable that the height of the support member 340 is set to be slightly longer, and the lower surface of the module frame 200 is spaced apart from the bottom part 1110 of the pack frame 1100 by a predetermined distance d1. In another example, although not specifically shown, a fixing member such as a nut surrounding the support member 340 can be provided at the lower end of the module mounting part 310, thereby preventing the battery module 100 including the end plates 301 and 302 from moving downward. That is, the fixing member that main- tains the separation distance by a predetermined interval d1 may be provided.

In embodiments of the present disclosure, since the vents 400, 500 and 600 are formed on the lower surface of the module frame 200 and heat or gas is discharged through the lower surface of the module frame 200, it is preferable to separate the lower surface of the module frame 200 from the bottom part 1110 of the pack frame 1100, thereby providing a space through which heat or gas is discharged.

In particular, since the vents 500 and 600 of FIGS. 8 and 9 induce the discharge in the direction from the first end plate 301 to the second end plate 302, it is preferable that the lower surface of the module frame 200 is spaced apart as described above. In addition, since the vent 600 of FIG. 9 forms a structure in which the connection part 630 and the outlet port 620 protrude, it may be more preferable that the lower surface of the module frame 200 is spaced apart.

Figure 11:
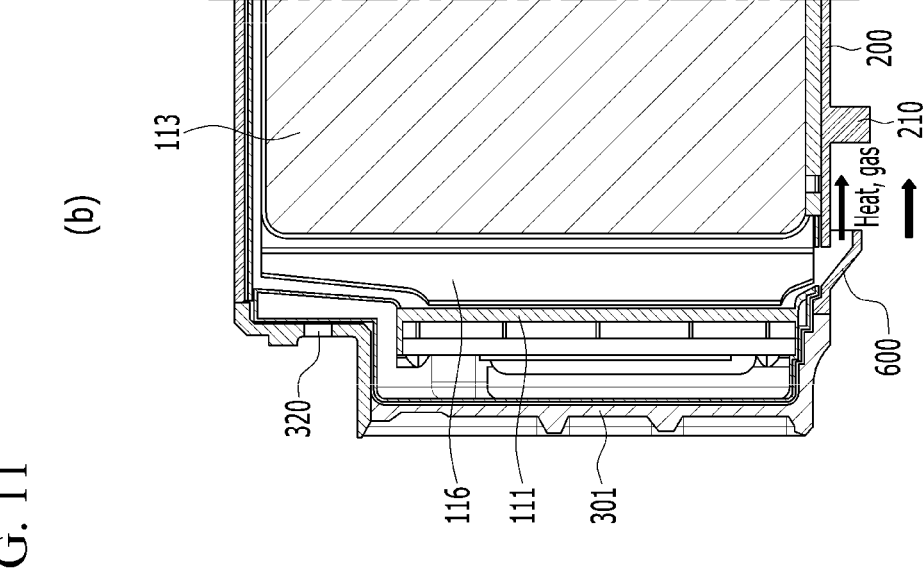
FIGS. 11*a* and 11*b* are cross-sectional views of a battery module in which a fulcrum member is formed, respectively.
Figure 11:
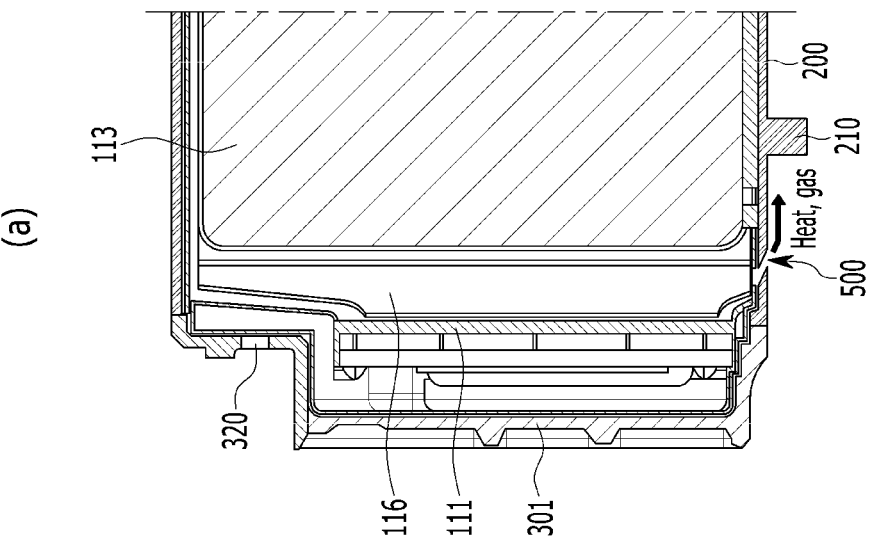

FIGS. 11*a* and 11*b* are cross-sectional views of a battery module in which a fulcrum member 210 is formed, respec- tively, in accordance with a modified embodiment of the present invention.

Referring to FIGS. 11*a* and 11*b*, a fulcrum member 210 projecting downward can be formed on the lower surface of the module frame 200.

When the battery module is mounted on the pack frame through the fulcrum member 210, the lower surface of the module frame 200 may be spaced apart from the bottom part of the pack frame. Accordingly, a space for discharging heat or gas is provided, and the discharged heat or gas can facilitate movement in the direction from the first end plate 301 to the second end plate 302.

The number of the fulcrum members 210 is not particu- larly limited, but it is preferable to have a plurality of members in order to stably support the battery module, and it is more preferable to evenly dispose them in all areas of the lower surface of the module frame 200.

For convenience of explanation, the vents 500 and 600 and the fulcrum member 210 are shown together in FIGS. 11a and 11b, but in consideration of the path of heat or gas, the fulcrum member 210 is preferably formed to be displaced from the vents 500 and 600. Specifically, it is preferable that the position of the vents 500 and 600 and the position of the fulcrum member 210 do not coincide with each other in the direction parallel to the surface of the cell body 113 (direction parallel to the x-axis in FIG. 5). This is for preventing the fulcrum member 210 from blocking the heat or gas discharged from the vents 500 and 600.

The material or the forming method of the fulcrum member 210 are not particularly limited, and it is preferable to have a predetermined strength so as to be able to support the battery module. The fulcrum member 210 may be of a configuration integrated with the module frame 200. Alternatively, it may have a configuration formed by joining a member such as a metal to the lower surface of the module frame 200.

Meanwhile, the number of the vents 400, 500 and 600 according to embodiments of the present disclosure is not particularly limited as described above, and may be one, or may be configured of a plurality of members. However, when a plurality of vents 400, 500 and 600 are formed, it is preferable that the plurality of vents 400, 500 and 600 are arranged in a direction parallel to the direction in which battery cells 110 are stacked so as to correspond to the position of the terrace part 116 of the battery cells 110 constituting the battery cell stack 120. Here, the direction in which the battery cells 110 are stacked refers to a direction perpendicular to the surface of the cell body 113, that is, a direction parallel to the y-axis in FIG. 5.

Referring back to FIG. 3, the module frame 200 according to embodiments of the present disclosure may have a mono frame structure or a structure in which an upper cover is joined to a U-shaped frame.

First, the mono frame may be in the form of a metal plate in which the upper surface, the lower surface and both side surfaces are integrated, and may be manufactured by extrusion molding.

Next, in the case of a structure in which the upper cover is joined to the U-shaped frame, it can be formed by joining the upper cover to the upper side of a U-shaped frame, which is a metal plate material having a lower surface and both side surfaces integrated, and it can be manufactured by press molding.

Figure 7:
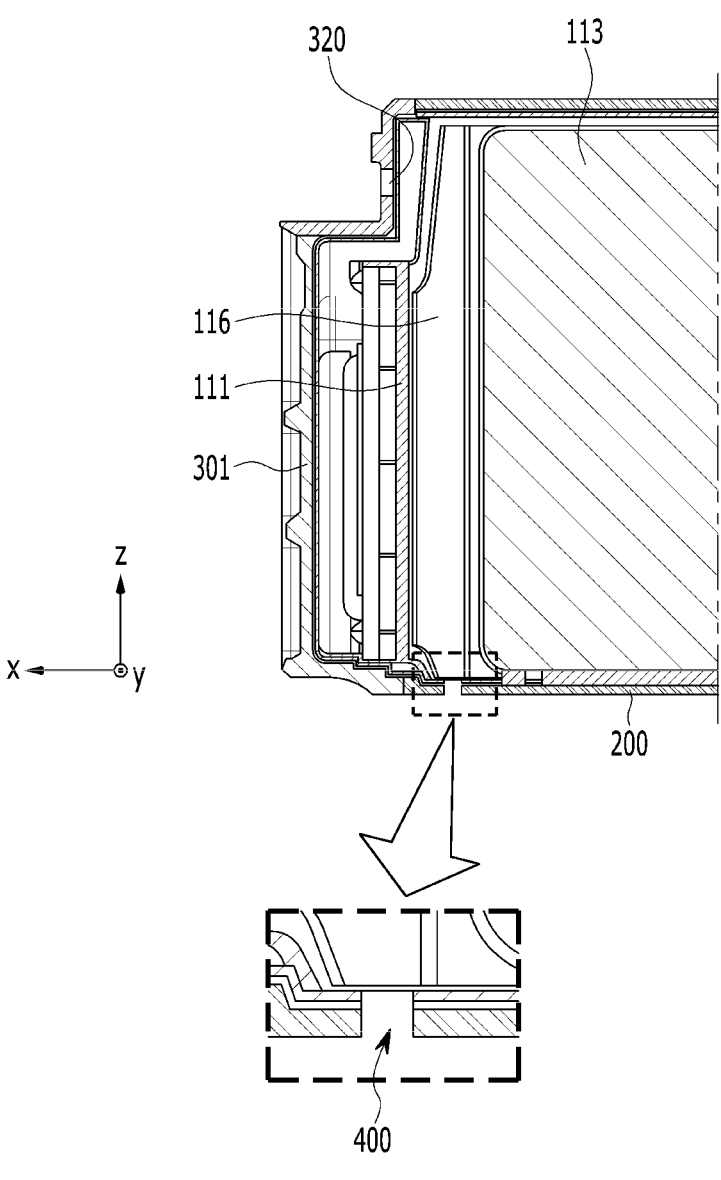
FIG. 7 is a cross-sectional view taken along the cutting line "B" of FIG. 5.

As shown in FIG. 7 or FIG. 8, the vents 400 and 500 of the hole structure may be applied to both a mono frame manufactured by extrusion molding and a U-shaped frame manufactured by press molding.

Meanwhile, as shown in FIG. 9, the vent 600 having a protruding structure is easier to be mounted on a U-shaped frame manufactured by press molding rather than a mono frame manufactured by extrusion molding. However, in forming the vent 600 of the protruding structure, it can be formed by forming a through hole in the lower surface of the module frame 200 and joining the connection part 630 and the outlet port 620 to the lower surface. In this case, the vent 600 is also applicable to a mono frame manufactured by extrusion molding.

Figure 12:
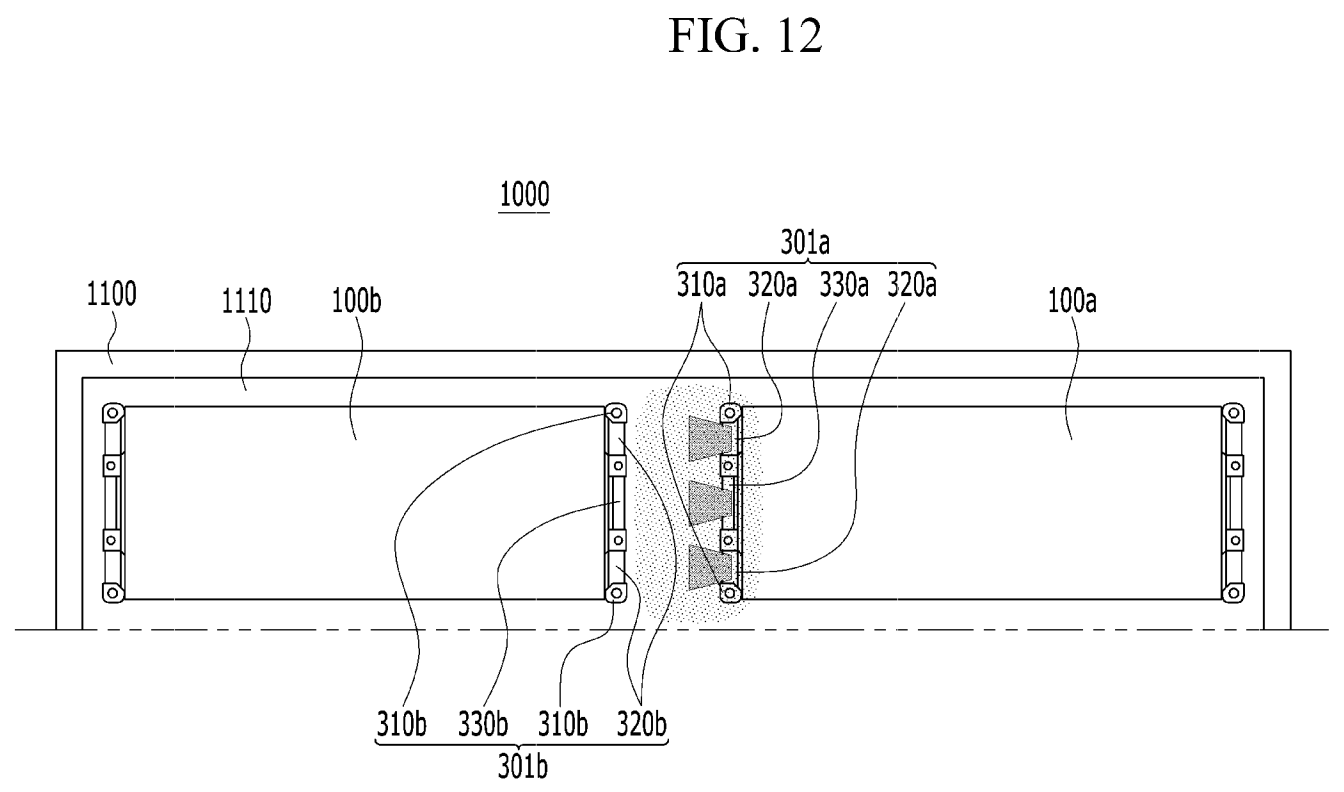

FIG. 12 is a top plan view of a battery pack 1000 according to embodiments of the present disclosure.

Referring to FIG. 12, the battery pack 1000 according to embodiments of the present disclosure may include two or more of the battery modules 100a and 100b described above.

The battery modules 100a and 100b may be housed in the pack frame 1100, and may be mounted together with various control and protection systems such as BMS (battery management system) and a cooling system.

The first battery module 100a and the second battery module 100b may have openings 320a, 330a, 320b and 330b formed on surfaces facing each other.

Specifically, the first end plate 301a of the first battery module 100a and the first end plate 301b of the second battery module 100b may face each other. At this time, the terminal bus bar opening 320a and the connector opening 330a may be formed in the first end plate 301a of the first battery module 100a. Further, a terminal bus bar opening 320b and a connector opening 330b may be formed in the first end plate 301b of the second battery module 100b.

The battery modules 100a and 100b according to embodiments of the present disclosure can provide the above-mentioned vent on the lower surface thereof, thereby reducing heat, gas, and flames emitted through the openings 320a, 330a, 320b and 330b.

In addition, the vents 500 and 600 shown in FIG. 8 or FIG. 9 may be provided in the battery modules 100a and 100b. Accordingly, the first battery module 100a can induce heat, gas, flame, etc. to be discharged in a direction opposite to the direction in which the second battery module 100b when is located, and the second battery module 100b can induce heat, gas, and flame to be discharged in a direction opposite to the direction in which the first battery module 100a is located. That is, damage that may be applied between the facing battery modules 100a and 100b can be minimized.

Further, the battery modules 100a and 100b according to embodiments of the present disclosure may be spaced apart from the bottom part 1110 of the pack frame 1100. Specifically, the battery modules 100a and 100b include a module mounting part 310 and a support member 340 shown in FIG. 10, or include a fulcrum member 210 shown in FIGS. 11a and 11b. Accordingly, a space for discharging heat, gas, flame, etc. may be provided inside the battery pack 1000.

The terms representing directions such as the front side, the rear side, the left side, the right side, the upper side, and the lower side have been used in embodiments of the present disclosure, but the terms used are provided simply for convenience of description and may become different according to the location of an object or an observer.

The battery module or the battery pack according to embodiments of the present disclosure described above can be applied to various devices. Specifically, it can be applied to vehicle means such as an electric bike, an electric vehicle, and a hybrid electric vehicle, and may be applied to various devices capable of using a secondary battery, without being limited thereto.

The present disclosure has been described in detail with reference to exemplary embodiments thereof, but the scope of the present disclosure is not limited thereto and modifications and improvements made by those skilled in the part by using the basic concept of the present disclosure, which are defined in the following claims, also belong to the scope of the present disclosure.

DESCRIPTION OF REFERENCE NUMERALS 100, 100a, 100b: battery module
110: battery cell
111, 112: electrode leads
113: cell main body
116: terrace part
120: battery cell stack
200: module frame
301: first end plate

302: second end plate
310: module mounting unit
400, 500, 600: vent
1000: battery pack
1100: pack frame

The invention claimed is:

1. A battery module comprising:
a battery cell stack in which a plurality of battery cells are stacked; a module frame for housing the battery cell stack, the module frame having an upper surface and a lower surface;
a first end plate and a second end plate located on a front surface and a rear surface of the battery cell stack, respectively,
wherein the battery cell stack is supported on the lower surface,
wherein a vent is formed in the lower surface of the module frame,
wherein each battery cell of the plurality of battery cells comprises:
a cell main body;
electrode leads formed to protrude from opposite ends of the cell main body; and
a terrace part formed to extend from the cell main body in a direction in which the electrode leads protrude,
wherein the vent is formed adjacent to a portion where the terrace part is located, and
wherein the vent discharges gas in a direction of the end plate located farther from the vent.

2. The battery module of claim 1, wherein:
the vent is formed at a position corresponding to a portion where the terrace part is located.

3. The Battery module of claim 1, wherein:
the vent has a hole structure formed on the lower surface of the module frame.

4. The battery module of claim 3, wherein:
the hole structure penetrates the lower surface of the module frame at an oblique angle.

5. The battery module of claim 4, wherein:
the hole structure has an inclined direction having an outlet closer to an end plate that is located farther from the vent among the first end plate and the second end plate.

6. The battery module of claim 1, wherein:
the vent comprises an inlet port formed on the lower surface of the module frame and facing the battery cell stack, an outlet port for discharging gas that has flowed in through the inlet port, and a connection part for connecting the inlet port and the outlet port, and
wherein the connection part overlaps a bottom wall of the module frame in a vertical direction.

7. The battery module of claim 6, wherein:
the outlet port is perpendicular to the inlet port.

8. The battery module of claim 6, wherein:
the connection part protrudes from the lower surface of the module frame.

9. A battery module comprising:

a battery cell stack in which a plurality of battery cells are stacked;
a module frame for housing the battery cell stack; and
a pack frame, the module frame being within the pack frame; and
a first end plate and a second end plate located on a front surface and a rear surface of the battery cell stack, respectively
wherein a vent is formed on a lower surface of the module frame,
wherein each battery cell of the plurality of battery cells comprises:
a cell main body:
electrode leads formed to protrude from opposite ends of the cell main body; and
a terrace part formed to extend from the cell case in a direction in which the electrode leads protrude,
wherein the vent is formed adjacent to a portion where the terrace part is located,
wherein the first end plate and the second end plate comprise a module mounting part for fixing the battery module,
wherein a support member having a first end and a second end is inserted into the module mounting part,
wherein the second end is below the lower surface of the module frame, and
wherein the lower surface of the module frame is spaced above a bottom part of a pack frame by the support member.

10. The battery module of claim 9, wherein:
the support member protrudes downwardly from the lower surface of the module frame.

11. A battery pack comprising two or more of the battery modules of claim 1, wherein among the two or more battery modules, a first battery module and a second battery module have openings formed on surfaces facing each other.

12. The battery pack of claim 11, wherein:
the vent of the first battery module is formed so as to discharge gas in a direction opposite to a direction in which the second battery module is located.

13. The battery pack of claim 11, further comprising a pack frame for housing the two or more battery modules,
wherein the two or more battery modules are spaced above a bottom part of the pack frame.

14. The battery module of claim 1, further comprising a pair of bus bar frames at a front and a rear of the battery cell stack, respectively; and
an upper plate on a top surface of the battery cell stack.

15. The battery module of claim 1, wherein the vent comprises an inlet port formed in the lower surface of the module frame and facing the battery cell stack, and a connection part extending downwardly from the lower surface of the module frame.

16. The battery module of claim 1, wherein a connector opening is formed in the end plate, the connector opening being closer to the upper surface than the lower surface.

\* \* \* \* \*